(12) United States Patent
Krieg et al.

(10) Patent No.: US 11,001,681 B2
(45) Date of Patent: May 11, 2021

(54) FIBER REINFORCED ELASTOMERIC SHEETS WITH TUNABLE STRAIN RELATIONSHIPS

(71) Applicant: University of Florida Research Foundation, Inc., Gainesville, FL (US)

(72) Inventors: Michael W. Krieg, Gainesville, FL (US); Kamran Mohseni, Gainesville, FL (US)

(73) Assignee: University of Florida Research Foundation, Incorporated, Gainesville, FL (US)

(*) Notice: Subject to any disclaimer, the term of this patent is extended or adjusted under 35 U.S.C. 154(b) by 70 days.

(21) Appl. No.: 15/842,065

(22) Filed: Dec. 14, 2017

(65) Prior Publication Data

US 2018/0171083 A1    Jun. 21, 2018

Related U.S. Application Data

(60) Provisional application No. 62/437,135, filed on Dec. 21, 2016.

(51) Int. Cl.
| | |
|---|---|
| *C08J 5/04* | (2006.01) |
| *C08K 7/02* | (2006.01) |
| *B32B 5/12* | (2006.01) |
| *B29L 31/00* | (2006.01) |

(52) U.S. Cl.
CPC ............... *C08J 5/04* (2013.01); *B32B 5/12* (2013.01); *C08K 7/02* (2013.01); *B29L 2031/7532* (2013.01); *B32B 2260/021* (2013.01); *B32B 2307/54* (2013.01); *C08J 2300/26* (2013.01); *C08L 2203/02* (2013.01)

(58) Field of Classification Search
CPC ............. B29L 2031/7532; B29L 31/00; B32B 2260/021; B32B 5/12; B32B 2307/54; C08J 2300/26; C08J 5/04; C08K 7/02; B92L 2031/7532; B29C 70/12; B29K 2105/128; D04H 1/60; D06N 3/106; C08L 2203/02
USPC .................. 428/297.4; 427/171; 156/229, 83
See application file for complete search history.

(56) References Cited

U.S. PATENT DOCUMENTS

| | | | | |
|---|---|---|---|---|
| 2,802,767 A | * | 8/1957 | Mighton | D06N 3/0034 156/83 |
| 2010/0318108 A1 | * | 12/2010 | Datta | A61L 31/10 606/151 |
| 2016/0288453 A1 | * | 10/2016 | Mejia-Ariza | B32B 5/00 |

OTHER PUBLICATIONS

Dragon Plate, What is Carbon Fiber?, accessed online Dec. 5, 2019.*

(Continued)

*Primary Examiner* — Camie S Thompson
(74) *Attorney, Agent, or Firm* — Alston & Bird LLP

(57) ABSTRACT

A soft structure fiber reinforcement technology is provided. In an example embodiment, the fiber reinforced elastomeric sheet comprises a sheet of elastomeric matrix; and a fiber array comprising a plurality of fibers embedded within the elastomeric matrix. Each fiber of the array of fibers has a tensile modulus that is significantly greater than the tensile modulus of the elastomeric matrix. The fiber reinforced elastomeric sheets may be used in grasping or gripping robots, walking or jumping robots, artificial muscles, compliant prosthetics, impact and/or vibration dampening soft structures, passive soft structure configured to passively restrict deformation in an unwanted direction while allowing deformation in another direction, and/or the like.

24 Claims, 6 Drawing Sheets

(56) References Cited

OTHER PUBLICATIONS

Poly-Tech Industrial, Inc., Nylon 6/6, accessed online Dec. 5, 2019.*
Krieg, Michael, et al., "Relative Planar Strain Control and Minimizing Deformation Work in Elastomeric Sheets via Reinforcing Fiber Arrays", *Science and Technology*, Sep. 21, 2016, 30 pages, Elsevier.com.

* cited by examiner

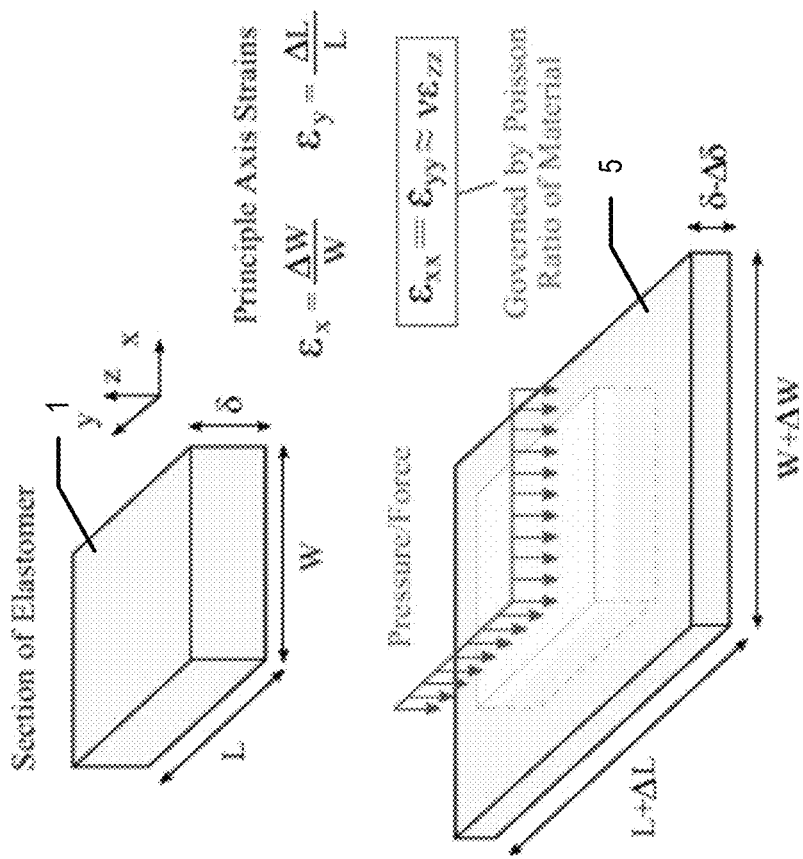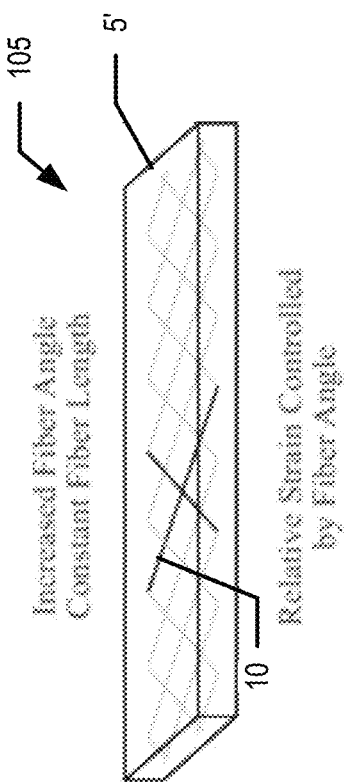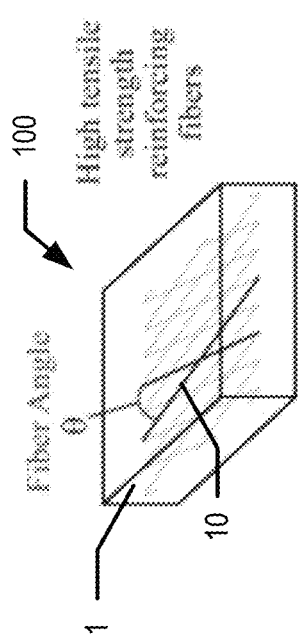

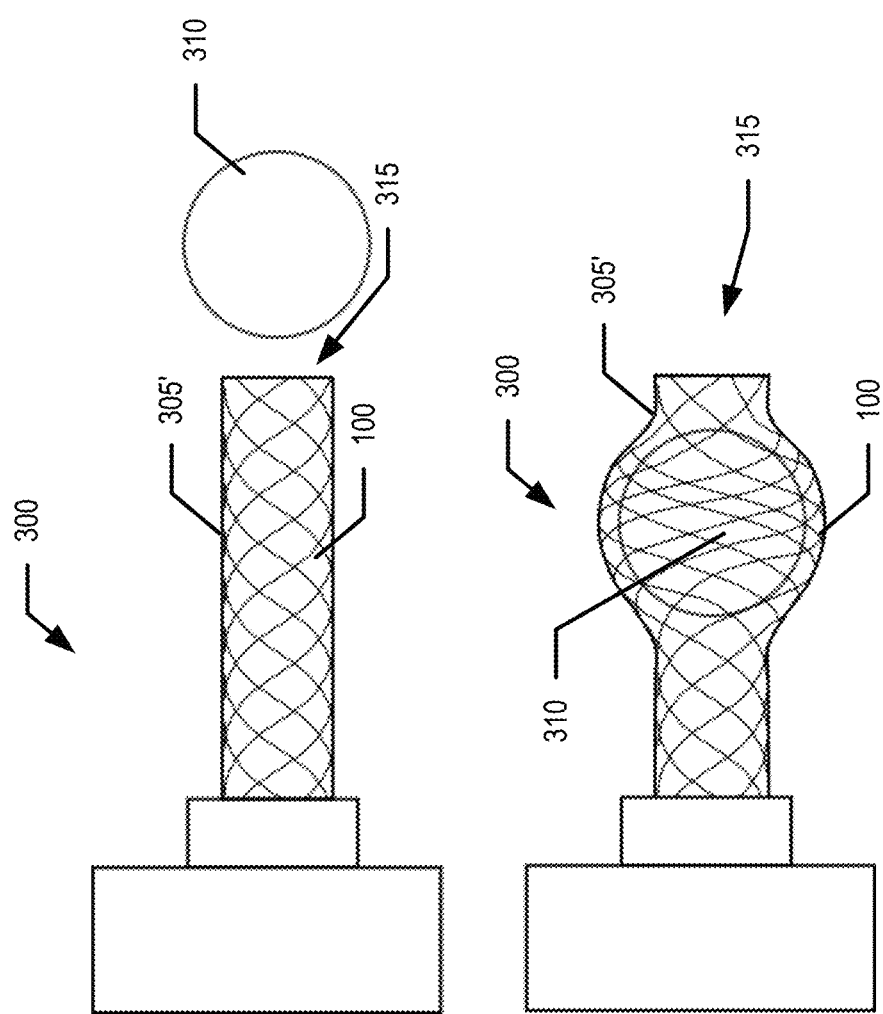

FIBER REINFORCED ELASTOMERIC SHEETS WITH TUNABLE STRAIN RELATIONSHIPS

CROSS-REFERENCE TO RELATED APPLICATIONS

This application claims priority to U.S. Appl. No. 62/437,135, filed Dec. 21, 2016, the content of which is hereby incorporated in its entirety.

FEDERALLY SPONSORED RESEARCH OR DEVELOPMENT

This invention was made with government support under N00014-16-1-2083 awarded by the United States Navy/Office of Naval Research. The government has certain rights in the invention.

BACKGROUND

Rigid structures are prone to critical failure when disturbances or perturbations result in high enough stress. Thus, rigid robotic structures are prone to critical failure. In contrast, soft structures are capable of bending to accommodate a disturbance and return to an operational state. In addition, there are several situations, such as tactile sensing, grasping, or in prosthetics where flexibility in a robotic actuator can prove advantageous to a desired action. A lack of supporting structural elements, however, means that actuation must be provided throughout a body in all three primary directions in order to maintain a desired shape. Furthermore traditional rigid robotic actuators do not drive motion of soft structures effectively, because they rely on transmitting large torques/forces through small contact points. Thus, there is a need in the art for soft structures for enhancing soft actuator's output and for restricting unwanted deformation.

BRIEF SUMMARY OF SOME EXEMPLARY EMBODIMENTS

Example embodiments provide a new use of soft composite structures as it relates to passively controlling soft body deformation through customizable anisotropic/asymmetric stress-strain properties; enhancing the output of a family of soft actuators and reducing both the number of required soft actuators and energy required to manipulate soft systems. The rise of soft robotics and other uses of soft systems has led to the development of several next generation soft actuators. There is a family of proposed soft actuators that we refer to as Poisson style soft actuators which generate a compressive force over a region of elastomeric material in order to drive an orthogonal expansion as governed by the material's Poisson ratio. These Poisson style soft actuators may include, but are not limited to, electro-active polymer actuators (also called dielectric actuators). Example embodiments provide an improved Poisson style soft actuator. Example embodiments provide a fiber reinforced actuator that provides increased expansion and/or deformation of the actuator in the preferred direction. Example embodiments include Poisson style soft actuators reinforced with fibers that are independently actuated (shape memory alloy fibers for example) to create bending motion or change material properties. Example embodiments include non-actuator composites that passively restrict deformation in unwanted directions while, as part of the same process, allowing and/or enhancing desired deformation in another direction. Example embodiments include soft composite structures composed of layers of fiber reinforced elastomeric sheets for impact damping and vibration damping. Various embodiments are provided for use in various soft systems, including soft robotics and passive soft structures.

In an aspect of the present invention, a fiber reinforced elastomeric sheet is provided. In an example embodiment, the fiber reinforced elastomeric sheet comprises a sheet of elastomeric matrix; and a fiber array comprising a plurality of fibers embedded within the elastomeric matrix. Each fiber of the array of fibers has a tensile modulus that is significantly greater than the tensile modulus of the elastomeric matrix.

In another aspect of the present invention, a fiber reinforced soft actuator is provided. In an example embodiment the soft actuator consists of two flexible conductor plates with a fiber reinforced elastomeric sheet in between. The sheet comprises of an elastomeric matrix; and a fiber array comprising a plurality of fibers within the matrix. For example, the fiber array may comprise a plurality of fibers embedded within the elastomeric matrix. The fiber array extends across the entire conductor area, in an example embodiment.

In another aspect of the present invention, a grasping robot is provided. In an example embodiment, the grasping robot comprises one or more fiber reinforced elastomeric sheets and a grasping component. Each of the one or more fiber reinforced elastomeric sheets comprises a sheet of elastomeric matrix; and a fiber array comprising a plurality of fibers embedded within the elastomeric matrix. Each fiber of the array of fibers has a tensile modulus that is significantly greater than the tensile modulus of the elastomeric matrix. In another example embodiment, the grasping mechanism consists of one or more fiber reinforced elastomeric sheets curved into a cylindrical tube. Each of the cylindrical fiber reinforced sheets (tubes) comprises a sheet of elastomeric matrix; and a fiber array comprising a plurality of fibers embedded within the elastomeric matrix. In an example embodiment, the grasping mechanism is configured to selectively receive and/or maintain (e.g., hold) one or more objects within the cylindrical tube formed of one or more elastomeric sheets.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1A provides a schematic diagram of an elastomeric sheet;

FIG. 1B provides a schematic diagram of a compressed elastomeric sheet;

FIG. 1C provides a schematic diagram of a fiber reinforced elastomeric sheet, in accordance with an example embodiment of the present invention;

FIG. 1D provides a schematic diagram of a compressed fiber reinforced elastomeric sheet, in accordance with an example embodiment of the present invention;

FIG. 2A provides a schematic diagram of a fiber reinforced elastomeric sheet, in accordance with an example embodiment of the present invention;

FIG. 5B is a diagram of another example grasping robot, whereby the grasping mechanism is a fiber reinforced elastomeric sheet rolled and/or formed into a cylindrical tube.

DETAILED DESCRIPTION OF SOME EXEMPLARY EMBODIMENTS

Figure 2A:
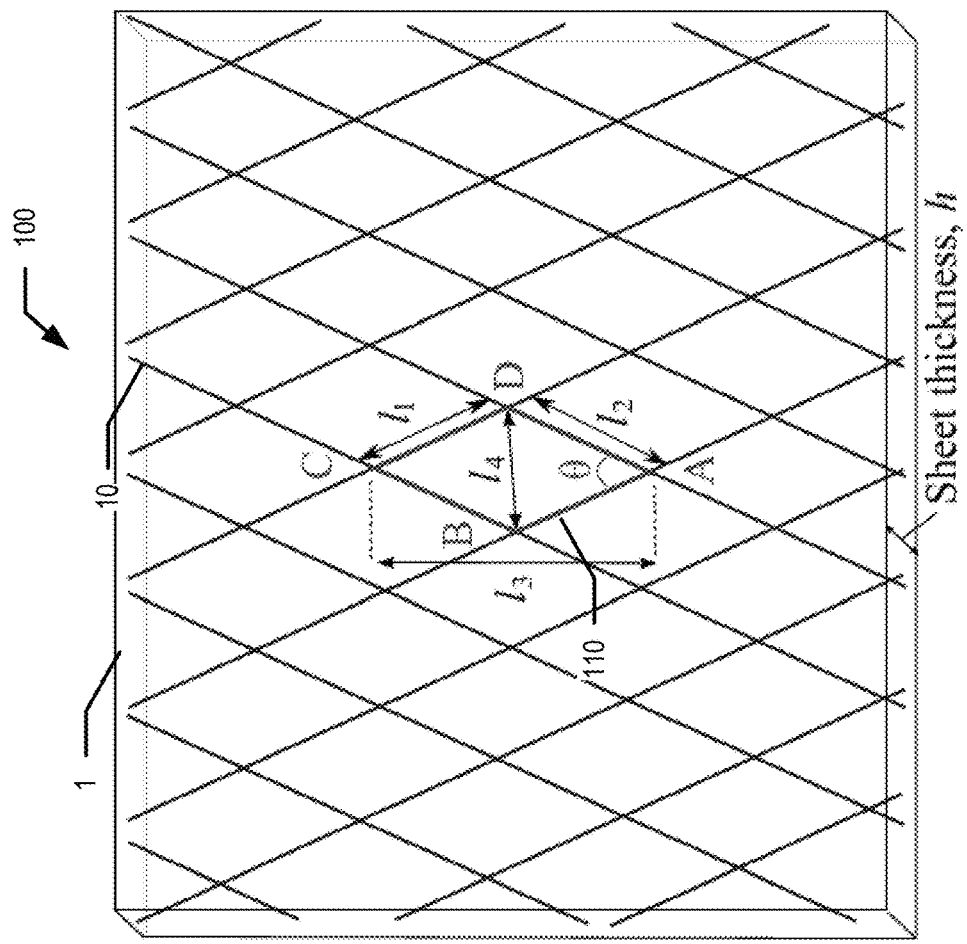
FIG. 2B shows a close up view of a smallest basic element of the fiber array shown in FIG. 2A, with unequal fiber spacing.

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

FIG. 1A shows an example elastomeric sheet 1. In an example embodiment, the elastomeric sheet 1 is part of a Poisson style soft actuator. In an example embodiment, the elastomeric sheet 1 is part of an Electro-Active Polymer (EAP) actuator or dielectric elastomer actuator (DEA). In an example embodiment, the elastomeric sheet 1 may be constructed out of Maxelast C4900 from APS elastomers. For example, the elastomeric sheet 1 may be made of a soft thermos-plastic elastomer. In example embodiments, various other elastomers may be used, as appropriate for the application.

In example embodiments, the elastomeric sheet 1 may generally define a sheet plane. Generally the thickness of the elastomeric sheet is small. For example, the thickness of the elastomeric sheet 1 may be significantly smaller than the width or length of the elastomeric sheet 1. In an example embodiment, the elastomeric sheet 1 may be generally planer and the width and the length of the elastomeric sheet 1 may define the sheet plane. In another example embodiment, the elastomeric sheet 1 may be generally cylindrical or curved and the sheet plane may be locally defined as the plane tangent to the local curvature of the elastomeric sheet 1. For easy reference, the sheet plane defined by the width and length of the elastomeric sheet 1 will be referred to as the xy plane herein and the thickness, which is generally perpendicular and/or normal to the sheet plane, will be referred to as the z axis herein. In an example embodiment, the thickness of the elastomeric sheet 1 may be approximately one-tenth or less of the width and/or the length of the elastomeric sheet. In an example embodiment, the thickness of the elastomeric sheet 1 may be approximately 0.25 inches. Example embodiments may consist of one or more fiber reinforced elastomeric sheets representing laminates or layers of a larger composite structure.

FIG. 1B shows an elastomeric sheet 1 in a compressed state 5. For example, the elastomeric sheet 1 in the compressed state 5 shown in FIG. 1B may be the example elastomeric sheet 1 of FIG. 1A with a uniform compression force acting thereon. In an example embodiment the compression force may be generated by the electrostatic force of an EAP. As shown in FIG. 1B, the thickness of the elastomeric sheet 1 in the compressed state 5 in the z direction may be smaller than the thickness of the uncompressed elastomeric sheet 1 in the z direction. Similarly, the length and width of the elastomeric sheet 1 in the compressed state 5 in the x and y directions may be larger than the length and width of the uncompressed elastomeric sheet 1 in the x and y directions. As the strains in the x and y directions are the same (e.g., $\varepsilon_{xx}=\varepsilon_{yy}$) for the example elastomeric sheet 1, the expansion of the elastomeric sheet 1 in the compressed state 5, compared to the uncompressed elastomeric sheet 1, is similar and/or uniform in the x and y directions. Similarly, in an example embodiment, if the thickness of the elastomeric sheet 1 is increased (e.g., by a repulsive electrostatic force), the length and width of the elastomeric sheet 1 is will be decreased in both the x and y directions.

FIG. 1C shows an example fiber reinforced elastomeric sheet 100. For example, fibers 10 may be embedded and/or suspended within a elastomeric sheet 1 to provide a fiber reinforced elastomeric sheet 100. For example, the elastomeric sheet 1 may be the middle section of an electro-active polymer actuator and a fiber array comprising a plurality of fibers 10 may be embedded and/or suspended therein. For example, a fiber array of a plurality of fibers 10 may be embedded and/or suspended within the matrix of the elastomeric sheet 1 to provide a fiber reinforced elastomeric sheet 100. In an example embodiment, the fibers 10 embedded and/or suspended within the elastomeric sheet 1 are chemically and/or mechanically bonded to the elastomer. For example the fiber array 10 may consist of cotton thread, whose small fibrils form a mechanical bond. In example embodiments, various other types of fibers may be used to build the fiber array, as appropriate for the application. In an example embodiment, the plurality of fibers 10 are continuous, meaning that fibers either extend the length/width of the sheet and/or local region of strain control, or the fiber tension forces are transmitted through joints across the length/width of the sheet and/or local region of strain control. The fiber array may be defined by the fiber angle $\theta$. The fiber angle $\theta$ is the angle between two intersecting fibers 10 of the fiber array. When the fiber reinforced elastomeric sheet 100 is compressed, the fiber angle increases to a compressed fiber angle $\theta_f$. In an example embodiment, the fiber angle is within the sheet plane. In an example embodiment, the fiber angle $\theta$ is uniform throughout the fiber array. For example, a uniform fiber array may be defined by an initial fiber angle $\theta_0$, which is the fiber angle in the uncompressed state. In other embodiments, the fiber angle $\theta$ may vary across the fiber array. For example, the fiber angle $\theta$ near the edges of the fiber reinforced elastomeric sheet 100 may be smaller than the fiber angle $\theta$ far from the edges of the fiber reinforced elastomeric sheet 100, and/or the like.

In an example embodiment, the fibers 10 have a high tensile strength and a low and/or negligable bending rigidity. For example, each fiber 10 defines a fiber axis. The fiber 10 is rigid along the corresponding fiber axis but bends freely in directions tangent to the fiber axis. In an example embodiment, the tensile modulus of the fibers 10 may be significantly larger than the tensile modulus of the eleastomeric matrix of the elastomeric sheet 1. For example, the tensile modulus of the fibers 10 may be at least one order of magnitude larger than the tensile modulus of the eleastomeric matrix of the elastomeric sheet 1. In example embodiments, the tensile modulus of the fibers 10 may be at least three or six orders of magnitude larger than the tensile modulus of the eleastomeric matrix of the elastomeric sheet 1.

Figure 2B:
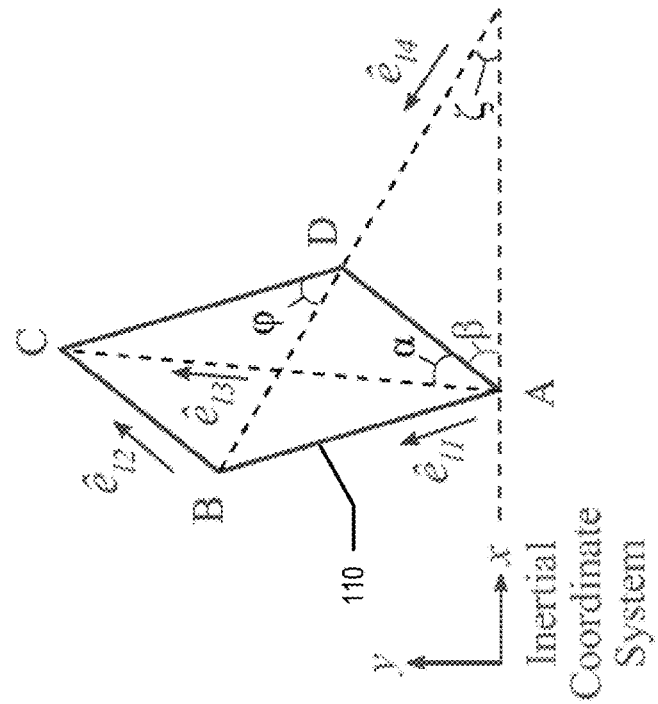

In an example embodiment, as shown in FIG. 1C, the fiber array may comprise a lattice of fibers. In an example embodiment, as shown in FIGS. 2A and 2B, the fiber array is a lattice-shaped when the smallest basic element 110 of the fiber array is diamond-shaped. In various embodiments, other forms of fiber arrays may be used as appropriate for the application. In an example embodiment, the fiber array may be defined by a consistent and/or uniform fiber angle θ. In other embodiments, the fiber angle θ may not be consistent throughout the array.

Example embodiments allow for the expansion of the elastomeric sheet 1 to be controlled such that, when compressed, fiber reinforced elastomeric sheet 100 does not expand evenly, symmetrically, and/or the like in both the x and y directions. Rather, in an example embodiment, a preferred direction of expansion is prescribed. In an example embodiment, the preferred direction may be defined by the fiber array comprising the plurality of the fibers 10. In the example embodiments, shown in FIGS. 1C, 1D, 2A, and 2B, the preferred direction is aligned and/or parallel with the x axis. In an example embodiment, a negative strain may be experienced in the orthogonal direction in the sheet plane. For example, the orthogonal direction may be a direction that is perpendicular to the preferred direction and in the sheet plane. In the example embodiments, shown in FIGS. 1C, 1D, 2A, and 2B, the orthogonal direction is aligned and/or parallel with the y axis. In an example embodiment, the fiber reinforced elastomeric sheet 100 may expand in the preferred direction and contract in the orthogonal direction when acted upon by a compressing force in the z direction.

FIG. 1D provides a schematic of an example of a fiber reinforced elastomeric sheet 100 in a compressed state 105 achieved by applying a compressing force in the z-direction. As can be seen in FIG. 1D, the fiber reinforced elastomeric sheet 100 in a compressed state 105 is primarily expanded and/or elongated in the preferred direction compared to the fiber reinforced elastomeric sheet 100 in the uncompressed state. In the orthogonal direction, the fiber reinforced elastomeric sheet 100 in a compressed state 105 may be minimally expanded in the orthogonal direction and/or possibly even compressed in the orthogonal direction, further increasing expansion in the preferred direction. In particular, as the fiber reinforced elastomeric sheet 100 is transformed from the uncompressed state to the compressed state 105 (e.g., by application of a compressive force in the z direction), the fibers 10 of the fiber array will not be elongated in length (due to their high tensile strength) and therefore, the expansion of the fiber reinforced elastomeric sheet in the orthogonal direction is prevented and/or reduced due to the fibers 10 of the fiber array. The fiber reinforced elastomeric sheet 100 is then forced to expand and/or become elongated in the preferred direction to a greater extent in response to the compressive force applied thereto in the z direction. This causes the fiber angle θ to be increased. In particular, if $\theta_0$ is the fiber angle of the uncompressed fiber reinforced elastomeric sheet 100 and $\theta_f$ is the fiber angle of the fiber reinforced elastomeric sheet 100 in a compressed state 105, then $$\theta_f = \arcsin\left(\sin(\theta_0)\frac{1}{1+\varepsilon_{zz}}\right),$$

for an elastomer in which volume is conserved, where $\varepsilon_{zz}$ is the strain experienced by the fiber reinforced elastomeric sheet 100 in the compressed state 105 in the direction perpendicular and/or normal to the sheet plane (e.g., in the z direction). Additionally, the strain of the fiber reinforced elastomeric sheet 100 in a compressed state 105 in the preferred (e.g., x) direction $\varepsilon'_{xx}$ is increased, compared to strain in the x direction $\varepsilon_{xx}$ of the non-reinforced elastomeric sheet 1, and the strain on the fiber reinforced elastomeric sheet 100 in a compressed state 105 in the counter (e.g., y) direction $\varepsilon'_{yy}$ is negative if the fiber angle is greater than zero. The strain in the y direction $\varepsilon_{yy}$ of the non-reinforced elastomeric sheet 1 is positive.

FIGS. 2A and 2B show an example fiber reinforced elastomeric sheet 100 wherein the fibers 10 of the fiber array are arranged in a lattice. The smallest basic element 110 of the array is shown. In particular, the smallest basic element 110 is defined by points A, B, C, and D. When the fiber reinforced elastomeric sheet 100 is compressed, the lengths $l_1$ and $l_2$ of the fibers 10 along the segments AB, BC, CD, and DA remain the same. In particular, the high tensile strength of the fibers 10 prevents the elongation of lengths $l_1$ and $l_2$ of the fibers 10. Thus, the lengths $l_3$ and $l_4$ are modified in a manner that preserves the lengths $l_1$ and $l_2$ when the fiber reinforced elastomeric sheet 100 experiences compression in the z direction. In particular, the lengths $l_3$ and $l_4$ are modified to accommodate and/or cause the expansion and/or elongation of the fiber reinforced elastomeric sheet 100 in the compressed state 105 in the preferred direction. In particular, the length across the smallest basic element 110 in the preferred direction $l_3$ is increased and the length across the smallest basic element 110 in the orthogonal direction $l_4$ is decreased when the fiber reinforced elastomeric sheet 100 experiences compression in the z direction. The combined increase of length $l_3$ across each smallest basic element 100 of the fiber array causes the expansion and/or elongation of the fiber reinforced elastomeric sheet 100 in the preferred direction. Similarly, the combined decrease in length $l_4$ across each smallest basic element 100 of the fiber array causes the negative strain in the orthogonal direction. Additionally, the increase of $l_3$ and decrease of $l_4$ causes the fiber angle to increase from the initial (e.g., noncompressed) fiber angle $\theta_0$ to the compressed fiber angle $\theta_f$ when the fiber reinforced elastomeric sheet 100 experiences compression in the z direction.

In another example embodiment, the reinforced elastomeric sheet can be used with a Poisson style soft actuator to provide tension/compression in one of the planar directions. For example, due to fiber reorientation during compression in the z-direction the length $l_3$ of the basic element 110 decreases, resulting in a negative strain $\varepsilon_{yy}$. This example embodiment cannot be realized by Poisson style actuators without organized reinforcement (e.g., unreinforced sheet 1). For example, compression of the unreinforced sheet 1, results in expansion in both planar directions. Therefore, compression of an elastomeric sheet will only result in compression in one of the planar directions through selective fiber reinforcement. In this example embodiment, if the soft actuator is desired to create planar expansion, the preferred direction is parallel to $l_4$ in the basic element 110 (e.g. x), and if the soft actuator is desired to create planar compression, the desired direction is parallel to l3 (e.g. y), As noted above, the compressed fiber angle $\theta_f$ is dependent on the initial fiber angle $\theta_0$ and the strain supplied in the z direction $\varepsilon_{zz}$. In an example embodiment, the fiber angle has a critical angle of $\theta_{crit}=\pi/2$ or 90°. In particular, in an example embodiment, compressing the fiber reinforced elastomeric sheet 100 such that $\theta_f \geq \theta_{crit}$ may lead to stretching of the fibers, separation between the elastomeric sheet 1 and the embedded fibers 10 of the fiber array, and/or the like. Thus, in the example embodiment, the choice of the initial, uncompressed fiber angle $\theta_0$ governs the range of compressive forces that can be applied to the fiber reinforced elastomeric sheet 100. In an example embodiment, after the critical fiber angle has been reached the stress/strain properties in the sheet plane directions become symmetric, and the sheet can be treated as a standard composite.

In example embodiments, as a desired expansion and/or elongation of the fiber reinforced elastomeric sheet 100 in the compressed state 105, in the preferred direction can be realized with less compression $\varepsilon_{zz}$, the energy required to operate an actuator made of the fiber reinforced elastomeric sheet 100 can be significantly smaller than a non-reinforced elastomeric sheet 1. When the initial, uncompressed fiber angle $\theta_0$ is smaller, a greater compressive force may be applied to the fiber reinforced elastomeric sheet before the critical angle is reached. However, for a fiber array having a smaller initial fiber angle $\theta_0$, the negative strain in the orthogonal direction experienced during compression is smaller and therefore provides less benefit. If the initial fiber angle $\theta_0$ is larger, the negative strain in the orthogonal direction experienced during compression is significant, despite the reduced range of allowable compression before the compressed fiber angle $\theta_f$ reaches the critical angle $\theta_{crit}$. For a given desired elongation of the sheet, increasing fiber angle reduces the necessary compression, but at the cost of increased sheet stiffness, as more tension (elastic potential energy) is stored in the fibers in order to create the asymmetric deformation. Each desired expansion has an optimal fiber angle that balances these competing effects and minimizes the required energy for deformation. Thus, the initial fiber angle $\theta_0$ may be selected based on the desired expansion and/or elongation of the compressed fiber reinforced elastomeric sheet 105. In particular, the optimal initial fiber angle $\theta_0$ decreases as the desired expansion and/or elongation in the preferred direction increases. Moreover, the optimal initial fiber angle $\theta_0$ increases as the ratio between the fiber tensile modulus and the elastomeric sheet matrix elastic modulus increases, such that less potential energy is stored in the fibers 10. In an example embodiment, the optimal initial fiber angle $\theta_0$ is between 30° and 60° depending on the desired expansion and/or elongation of the compressed fiber reinforced elastomeric sheet 105. If the tensile modulus of the fiber is significantly greater than the tensile modulus of the elastomeric sheet matrix (e.g., the tensile modulus of the fiber is effectively infinite compared to the tensile modulus of the elastomeric sheet matrix), the optimal initial fiber angle $\theta_0$ may be as high as 68° for one application.

In another embodiment, where the fiber reinforced elastomeric sheet is used as a passive shape restoring mechanism, optimal fiber angle $\theta_0$ should be tuned, instead, to maximize potential energy storage. In another embodiment, where stacks of fiber reinforced elastomeric sheets are used for impact damping or vibration damping, the optimal fiber angle $\theta_0$ can be tuned with respect to the range of allowable strain and/or the vibration low pass cutoff frequency.

Figure 3:
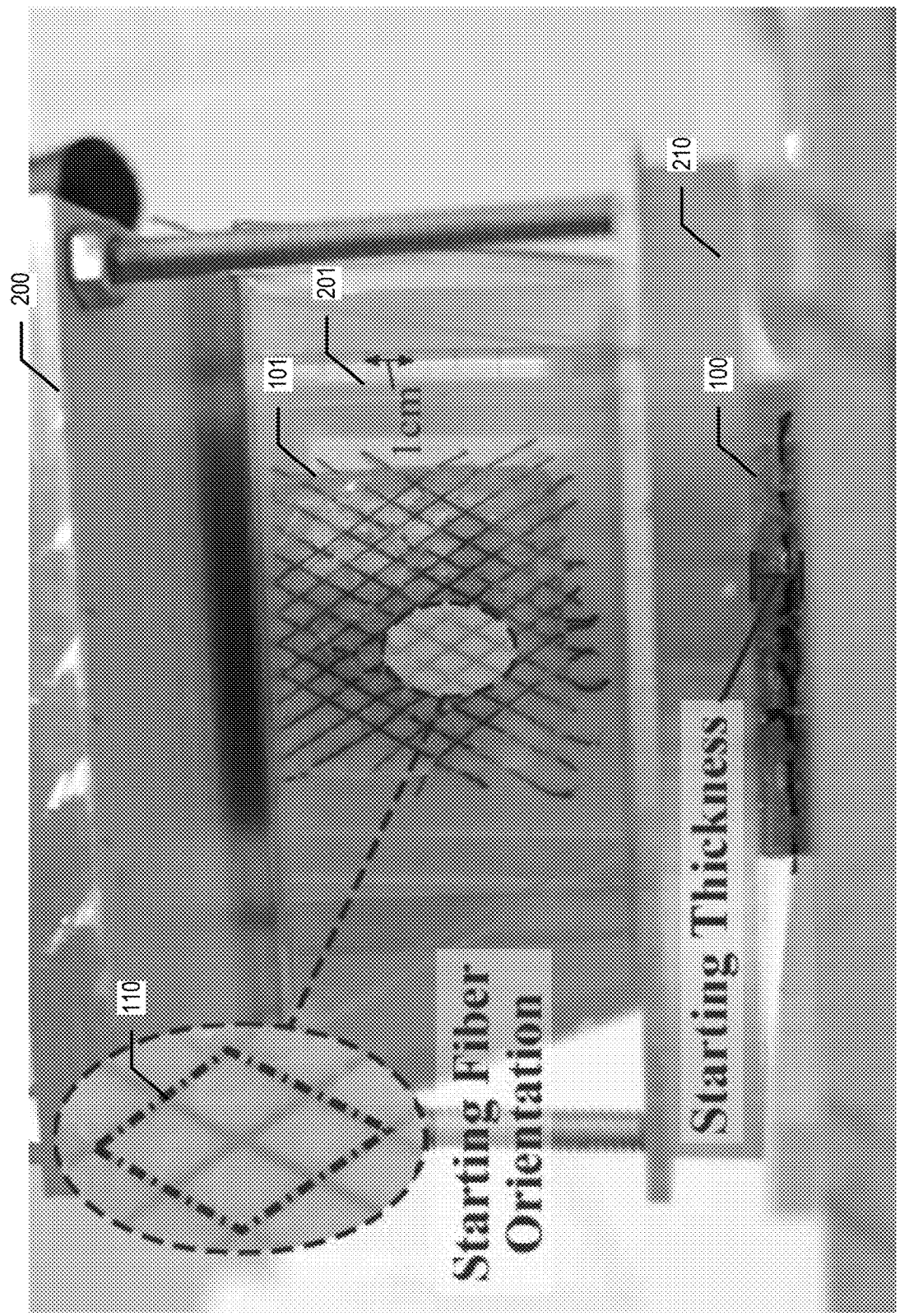
FIG. 3 shows an example fiber reinforced elastomeric sheet, in accordance with an example embodiment of the present invention, and shows a device used to compress the fiber reinforced elastomeric sheet, which has an angled mirror to allow simultaneous viewing of sheet area and thickness.
Figure 4:
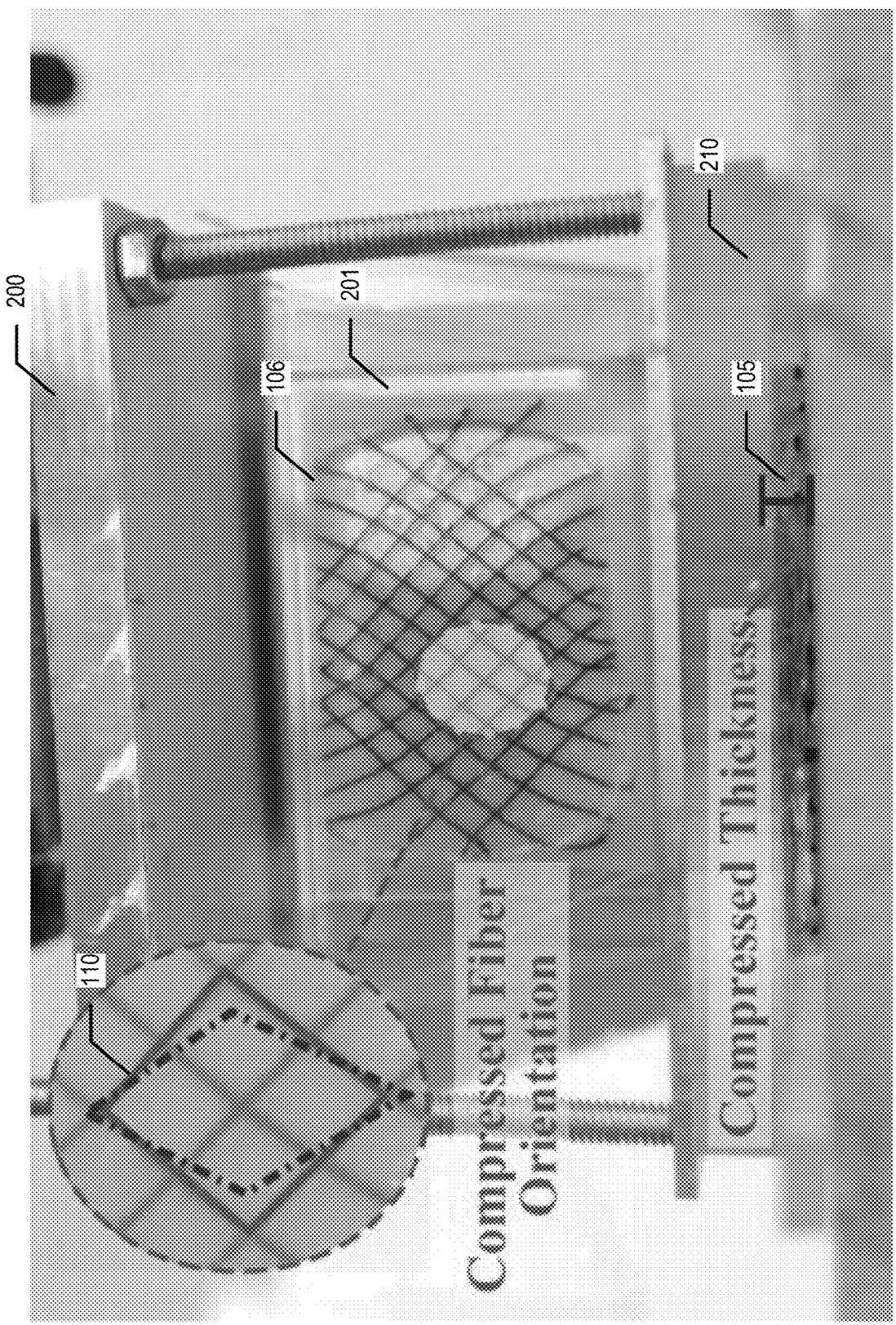
FIG. 4 shows the example fiber reinforced elastomeric sheet of FIG. 3 under compression.

FIG. 3 shows an example fiber reinforced elastomeric sheet 100 in a device 200 configured to compress the fiber reinforced elastomeric sheet 100 in the z direction. FIG. 4 shows the example fiber reinforced elastomeric sheet 100 in a compressed state 105. In particular, the device 200 is acting to compress the example fiber reinforced elastomeric sheet 100 to provide a compressed elastomeric sheet 105. The example device 200 comprises a transparent plate 210 configured to apply a compressive force to the fiber reinforced elastomeric sheet 100 and a mirror 201 such that the fiber reinforced elastomeric sheet 100 may be viewed beneath the plate 210. For example, the reflection 101 of the fiber reinforced elastomeric sheet 100 and the reflection 106 of the fiber reinforced elastomeric sheet 100 in the compressed state 105 may be viewed via the mirror 201.

In an example embodiment, a compression force may be applied to a fiber reinforced elastomeric sheet 100 by using plates (e.g., plates 210) to physically compress the reinforced elastomeric sheet. In an example embodiment, the compressive force may be applied using electrostatic and/or electromagnetic forces. For example, the matrix of the elastomeric sheet may have an electrostatic or magnetic field dipole. The fiber reinforced elastomeric sheet 100, or a portion thereof, may be sandwiched between flexible conducting plates. The flexible conducting plates may be charged, creating a capacitive force there-between which compresses the sandwiched fiber reinforced elastomeric sheet 100. In another example embodiment, tension may be applied in the x or y directions to create significant non-linear contraction in the opposing direction. In another embodiment, the compressive force on the fiber reinforced elastomeric sheet 100 may be applied via hydrostatic pressure in pockets disposed adjacent the fiber reinforced elastomeric sheet 100 that filled with compressed air or another fluid. Other techniques of applying a compressive force may be utilized in various embodiments, as appropriate for the application.

Figure 5A:
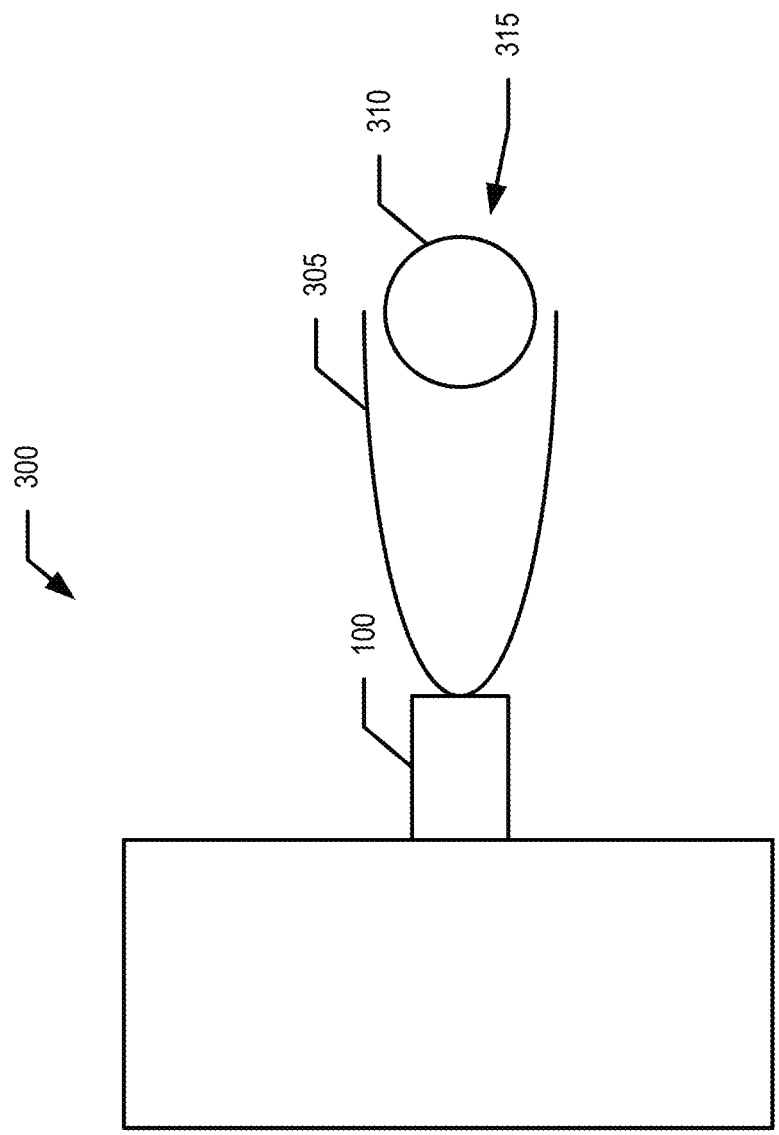
FIG. 5A is a block diagram of an example grasping robot, in accordance with an example embodiment of the present invention.

The ability to control strain properties of a deformable material is advantageous in providing structural support for a number of soft systems. In example embodiments, one or more fiber reinforced elastomeric sheets 100 may be used in soft robotics such as artificial muscles configured for replacing damaged muscle tissue. In another example, one or more fiber reinforced elastomeric sheets 100 may be used in soft robotics such as compliant prosthetics. In an example embodiment, one or more fiber reinforced elastomeric sheets 100 may be used for various applications in walking and jumping robots. In an example embodiment, a walking or jumping robot may be a robot configured to move using a walking-like and/or jumping-like motion. For example, one or more fiber reinforced elastomeric sheets 100 may be used for one or more applications for robots that are configured to traverse difficult terrains. In another example embodiment, as shown in FIG. 5A, one or more fiber reinforced elastomeric sheets 100 may be used for one or more applications for grasping robots 300. For example, one or more fiber reinforced elastomeric sheets 100 may be used for one or more applications for grasping robots 300 that require large tactile sensitivity. For example, a grasping robot may be configured to grasp and/or package delicate objects 310, and/or the like. In an example embodiment, a grasping robot 300 may comprise a grasping component 305 configured to grip or grasp an object 310 and one or more fiber reinforced elastomeric sheets 100. For example, the one or more fiber reinforced elastomeric sheets 100 may be used to control the grasping component 305. In an example embodiment, deformation of an elastomeric sheet 100 of the one or more elastomeric sheets of the gripping robot 300 may control a position of the grasping component 305. For example, the deformation of one or more fiber reinforced elastomeric sheets 100 may cause an opening 315 of the grasping component 305 to be made larger or smaller to allow for grasping an item or releasing an object 310. In an example embodiment the grasping mechanism itself may be comprised of one or more fiber reinforced elastomeric sheets 100 rolled into a cylindrical tube 305', as shown in FIG. 5B. For example, the cylindrical tube 305' formed from the one or more fiber reinforced elastomeric sheets 100 may be embedded with one or more Poisson style soft actuators. In this example embodiment, activating the soft actuators results in a reduction in tube thickness, which is coupled to an increase in tube diameter via fiber reorientation. In this example embodiment, the opening 315 of the cylindrical tube 305' can extend over a delicate object 310, and when the actuators are deactivated the cylindrical tube 305' will wrap around the object such that the cylindrical tube 305' grasps the object 310. In another example embodiment, one or more fiber reinforced elastomeric sheets 100 may be used for one or more applications for impact dampening and/or vibration dampening. For example, the initial fiber angle $\theta_0$ can be tuned with respect to the range of allowable strain and/or the vibration low pass cutoff frequency. In another example embodiment, a soft structure comprising one or more fiber reinforced elastomeric sheets 100 may be used to passively restrict deformation in unwanted directions of a system while, as part of the same process, allowing and/or enhancing desired deformation in another direction. In another example, the initial fiber angle $\theta_0$ may be tuned to maximize potential energy storage, in order to passively restore a soft body to its un-deformed shape.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A fiber reinforced elastomeric sheet comprising:
    a sheet of elastomeric matrix; and
    a fiber array comprising a plurality of fibers embedded within the elastomeric matrix, the fiber array being a two-dimensional lattice of fibers embedded within the elastomeric matrix,
    wherein:
        the sheet of elastomeric matrix defines a sheet plane,
        the two-dimensional lattice is defined by a diamond-shaped smallest basic element, wherein the diamond-shaped smallest basic element is comprised of four sides and each of the four sides is formed by a different fiber, such that the two-dimensional lattice consists of a plurality of at least partial smallest basic elements,
        the basic element defines a preferred direction of the two-dimensional lattice such that responsive to experiencing a compressive force in a direction normal to the sheet plane, the fiber reinforced elastomeric sheet is configured to elongate in the preferred direction, and
        each fiber of the array of fibers has a tensile modulus that is significantly greater than the tensile modulus of the elastomeric matrix.

2. The fiber reinforced elastomeric sheet of claim 1, wherein the tensile modulus of a fiber of the fiber array is at least one order of magnitude greater than the tensile modulus of the elastomeric matrix.

3. The fiber reinforced elastomeric sheet of claim 1, wherein the smallest basic element of the two-dimensional lattice is diamond shaped with a uniform fiber angle.

4. The fiber reinforced elastomeric sheet of claim 1, wherein the preferred direction being transverse to a direction parallel to one or more fibers of the fiber array.

5. The fiber reinforced elastomeric sheet of claim 4, wherein the fiber array lies in and/or parallel to the sheet plane and the preferred direction is in the sheet plane.

6. The fiber reinforced elastomeric sheet of claim 5, wherein, in response to experiencing a compressive force in a direction normal to the sheet plane, the fiber reinforced elastomeric sheet experiences a negative and/or negligible strain in an orthogonal direction.

7. The fiber reinforced elastomeric sheet of claim 6, wherein the orthogonal direction is within the sheet plane and perpendicular to the preferred direction.

8. The fiber reinforced elastomeric sheet of claim 1, wherein the fiber array is defined by a uniform fiber angle.

9. The fiber reinforced elastomeric sheet of claim 8, wherein the fiber angle is between 15 and 25 degrees.

10. The fiber reinforced elastomeric sheet of claim 8, wherein the fiber angle is between 15 and 68 degrees.

11. The fiber reinforced elastomeric sheet of claim 1, wherein the fiber array is defined by a fiber angle and the fiber angle is consistent with an optimal fiber angle determined based at least in part on a desired elongation of the fiber reinforced elastomeric sheet for an intended application for the fiber reinforced elastomeric sheet when the fiber reinforced elastomeric sheet is experiencing the compressive force.

12. The fiber reinforced elastomeric sheet of claim 1, wherein the sheet of elastomeric matrix is configured to be compressed by a capacitive force.

13. The fiber reinforced elastomeric sheet of claim 1, wherein the fiber reinforced elastomeric sheet is at least in part sandwiched between flexible conducting plates.

14. The fiber reinforced elastomeric sheet of claim 13, wherein a compressive force is experienced by the fiber reinforced elastomeric sheet when the conducting plates are charged.

15. The fiber reinforced elastomeric sheet of claim 1, wherein the elastomeric sheet is incorporated into an artificial muscle or a portion of an artificial muscle.

16. The fiber reinforced elastomeric sheet of claim 1, wherein the elastomeric sheet is incorporated into a compliant prosthetic or a portion of a compliant prosthetic.

17. The fiber reinforced elastomeric sheet of claim 1, wherein the elastomeric sheet is incorporated into a passive soft structure configured to passively restrict deformation in an unwanted direction while allowing deformation in another direction.

18. The fiber reinforced elastomeric sheet of claim 1, wherein the elastomeric sheet is incorporated into an impact dampening and/or vibration dampening soft structure.

19. The fiber reinforced elastomeric sheet of claim 18, wherein an initial fiber angle of the fiber reinforced elastomeric sheet is tuned with respect to a range of allowable strain and/or a vibration low pass cutoff frequency.

20. The fiber reinforced elastomeric sheet of claim 1, wherein the elastomeric sheet is incorporated into a walking or jumping robot.

21. A grasping robot comprising:
    one or more fiber reinforced elastomeric sheets, each of the one or more fiber reinforced elastomeric sheets comprising:
        a sheet of elastomeric matrix, and
        a fiber array comprising a plurality of fibers embedded within the elastomeric matrix, the fiber array being a two-dimensional lattice of fibers embedded within the elastomeric matrix, wherein:
the sheet of elastomeric matrix defines a sheet plane,
the two-dimensional lattice is defined by a diamond-shaped smallest basic element such that the two-dimensional lattice consists of a plurality of at least partial smallest basic elements, the diamond-shaped smallest basic element being comprised of four sides, each of the four sides being formed by a different fiber,
the basic element defines a preferred direction of the two-dimensional lattice such that responsive to experiencing a compressive force in a direction normal to the sheet plane, the fiber reinforced elastomeric sheet is configured to elongate in the preferred direction, and
each fiber of the array of fibers has a tensile modulus that is significantly greater than the tensile modulus of the elastomeric matrix; and
a grasping component.

22. The grasping robot of claim 21, wherein the grasping robot is configured to perform tasks requiring large tactile sensitivity using the grasping component.

23. The grasping robot of claim 21, wherein the grasping robot is configured to grasp and/or package delicate objects using the grasping component.

24. The grasping robot of claim 21, wherein deformation of at least one of the one or more fiber reinforced elastomeric sheets controls a position of the grasping component.

* * * * *